US010058815B2

(12) United States Patent
Fitch et al.

(10) Patent No.: US 10,058,815 B2
(45) Date of Patent: Aug. 28, 2018

(54) METHODS FOR SEPARATING OZONE

(71) Applicants: Frank R. Fitch, Bedminster, NJ (US); Apurva Maheshwary, Edison, NJ (US)

(72) Inventors: Frank R. Fitch, Bedminster, NJ (US); Apurva Maheshwary, Edison, NJ (US)

(73) Assignee: Linde Aktiengesellschaft, Munich (DE)

( * ) Notice: Subject to any disclaimer, the term of this patent is extended or adjusted under 35 U.S.C. 154(b) by 24 days.

(21) Appl. No.: 15/377,021

(22) Filed: Dec. 13, 2016

(65) Prior Publication Data

US 2018/0065079 A1   Mar. 8, 2018

Related U.S. Application Data

(63) Continuation-in-part of application No. 15/259,775, filed on Sep. 8, 2016, now abandoned.

(51) Int. Cl.
*B01D 53/04* (2006.01)
*B01D 53/053* (2006.01)

(52) U.S. Cl.
CPC ....... *B01D 53/053* (2013.01); *B01D 53/0423* (2013.01); *B01D 2253/106* (2013.01); *B01D 2253/108* (2013.01); *B01D 2256/12* (2013.01); *B01D 2257/106* (2013.01); *B01D 2259/404* (2013.01); *B01D 2259/40052* (2013.01); *B01D 2259/40056* (2013.01); *B01D 2259/41* (2013.01)

(58) Field of Classification Search
CPC .............. B01D 53/0423; B01D 53/053; B01D 2253/106; B01D 2253/108; B01D 2256/12; B01D 2257/106; B01D 2259/40052; B01D 2259/40056; B01D 2259/404; B01D 2259/41
USPC ................................... 95/138, 148; 423/219
See application file for complete search history.

(56) References Cited

U.S. PATENT DOCUMENTS

| | | | | |
|---|---|---|---|---|
| 5,730,783 A * | 3/1998 | Sanui | ................. | B01D 53/0462 95/11 |
| 6,030,598 A * | 2/2000 | Topham | ............... | B01D 53/047 423/581 |
| 6,344,130 B1* | 2/2002 | Koike | ............... | B01D 53/0462 205/626 |
| 8,337,674 B2* | 12/2012 | Weist | .................. | B01D 53/047 204/176 |
| 8,460,435 B2* | 6/2013 | Tabata | .................. | B01D 53/04 422/186.08 |
| 2017/0173514 A1* | 6/2017 | Fitch | ................... | B01D 53/047 |

\* cited by examiner

*Primary Examiner* — Frank M Lawrence, Jr.
(74) *Attorney, Agent, or Firm* — Philip H. Von Neida

(57) ABSTRACT

A method for separating ozone from a mixture of oxygen and ozone by feeding the mixture to at least one adsorbent bed containing an adsorbent material for adsorbing ozone. The adsorbent bed can be one of four adsorbent beds in a continuous adsorption cycle for producing ozone recycling the non-adsorbed oxygen together with make-up oxygen to the ozone generator or using it as a purge gas. An external purge gas is used to desorb the ozone to the customer process. With four beds present, for most of the time, two beds are in adsorption mode while the other two beds are in regeneration/production mode.

19 Claims, 8 Drawing Sheets

FIG. 2

4-BED OXYGEN RECOVERY PROCESS SEQUENCE (X=BED- A,B,C OR D)

| | S1 FEED AND RECYCLE STEP | S2 BED PURGE AND PRODUCTION STEP | S3 EXTERNAL PURGE AND PRODUCTION STEP | S4 SEND PURGE AND VENT STEP | S5 SEND PURGE STEP |
|---|---|---|---|---|---|
| | OXYGEN TO RECYCLE CIRCUIT ← [X] ← FEED GAS FROM OZONE GENERATOR | RECEIVE PURGE FROM OTHER BED TO RECYCLE → [X] → PRODUCT | RECEIVE PURGE FROM AIR OR NITROGEN RICH GAS → [X] → PRODUCT | SEND PURGE TO OTHER BED AND PARTIAL VENT ← [X] ← FEED GAS FROM OZONE GENERATOR | SEND PURGE TO OTHER BED ← [X] ← FEED GAS FROM OZONE GENERATOR |
| OPEN | X-4 AND X-1 | X-2 AND X-5 | X-3 AND X-5 | X-4, X-2 AND 6 | X-4 AND X-2 |

FIG. 3

METHODS FOR SEPARATING OZONE

CROSS REFERENCE TO RELATED APPLICATIONS

The present application claims priority from U.S. patent application Ser. No. 15/259,775 filed on Sep. 8, 2016 and from U.S. Provisional Patent Application Ser. No. 62/216,545 filed on Sep. 10, 2015.

BACKGROUND OF THE INVENTION

Ozone is utilized in a number of industrial processes, including drinking water and waste water treatment and disinfection, pulp bleaching, ozonolysis reactions in fine chemical production, and flue-gas denitrification.

Ozone is unstable decomposing to oxygen under ambient conditions and hence cannot be manufactured, transported and stored in the manner of typical chemicals of commerce. Instead, ozone must be produced at point-of-use at the time it is needed. Since ozone is a toxic material its generation only where and when it is required limits the possibility and potential impact of incidents.

Ozone is typically generated from oxygen utilizing a corona discharge. If oxygen is used as the source of oxygen for a given ozone generator then ozone concentrations of 10 to 15% by weight (balance oxygen) can be prepared. If air is used as the source of oxygen then ozone concentrations of 1.5 to 3% (balance air) can be prepared. For moderate to large ozone requirements, the overall capital plus operating costs are typically less when oxygen is used as the oxygen source.

Ozone is therefore often utilized at 10 wt %, ozone with the balance being largely oxygen. It has long been recognized that the re-use of the oxygen from the ozone/oxygen mixture generated by oxygen-based ozone generators would substantially improve the economics for ozone generation. Many schemes have been proposed for the separation of ozone from the ozone/oxygen output stream from the ozone generator, thus allowing oxygen to be recycled back to the ozone generator. In most of these schemes the separated ozone is displaced into the final ozone-utilizing process by means of an inert gas stream. Balcar et al. Ozone Chemistry and Technology, pp 53 to 59, Advances in Chemistry; American Chemical Society, Washington, D.C. 1959 proposed the cryogenic liquefaction of the ozone, with re-evaporation of the condensed ozone into a carrier gas. Kiffer et al (U.S. Pat. No. 2,872,397) and Cook et al., Ozone Chemistry and Technology, pp. 44 to 52, Advances in Chemistry; American Chemical Society, Washington, D.C. 1959 proposed the use of a silica gel adsorbent to selectively adsorb ozone from the ozone/oxygen mixture after cooling of the stream, with subsequent desorption of the ozone to the customer process by means of an inert gas, such as air, nitrogen, argon, etc., or by application of a vacuum.

Many improvements and variations on the use of selective adsorbents to allow recycle of the unused oxygen to the ozone generator and an ozone product stream have been proposed. These include the following patent specifications.

U.S. Pat. No. 4,786,489 targets reducing the costs for large scale ozone and teaches the use of a low temperature (−80 to −90° C.) ozone/oxygen separation unit that is purged with an impure nitrogen carrier gas stream containing oxygen and/or air to give the ozone product.

U.S. Pat. No. 5,520,887 is targeted at reducing the costs of ozone generation for pulp bleaching and teaches the use of a PSA oxygen generator to provide an enriched oxygen feed to an ozone generator, an oxygen ozone PSA to adsorb ozone and at the same time recycle oxygen to the ozone generator. The nitrogen rich waste gas from the $O_2$ PSA is used to purge adsorbed ozone from the ozone oxygen PSA to the ozone consuming process.

U.S. Pat. No. 6,030,598 describes the production of an ozone containing gas stream by subjecting oxygen to an electric discharge, adsorbing the ozone thus generated on to a solid adsorbent (such as zeolite) and recycling the oxygen containing stream leaving the adsorbent to the ozonising process. Periodically, oxygen adsorbed on the adsorbent is desorbed by co-currently passing a purge gas over the adsorbent and the desorbed oxygen is also recycled to the ozonizer. Ozone is desorbed from the adsorbent by a counter-current flow of purge gas and used in the ozone demanding process. A 3-bed (or multiple thereof) process and cycle is described that allows ozone and recycled oxygen to be produced continuously, but still requires each bed to experience a non-productive hold step within a full cycle.

U.S. Pat. No. 6,197,091 describes the use of an ozone/oxygen membrane separation system in which ozone permeates through the membrane and is carried with a carrier gas, such as nitrogen, argon or $CO_2$ into the ozone utilizing application, and at the same time the oxygen enriched stream is recycled to the ozone generator.

U.S. Pat. No. 6,916,359 describes a method of providing ozone at a pressure above atmospheric pressure that comprises an ozone generator and an oxygen ozone PSA system. The unadsorbed oxygen from the PSA is recycled back to the ozone generator and the ozone product is carried into the ozone application by means of an inert gas stream at a pressure such that no further compression is needed. The carrier gas can be nitrogen, but is preferentially compressed air used also to feed a PSA oxygen generator that can be used as the oxygen source.

U.S. Pat. No. 7,766,995 is targeted at reducing the cost of ozone utilized in the removal and capture of NOx from industrial flue-gas and other process streams. It teaches the use of an oxygen ozone separation means to allow recycle of oxygen back to the ozone generator and the use of clean dry air to carry the ozone into the industrial process. Optimum ozone production costs are achieved by recycling oxygen to the ozone generator, using the cheapest possible carrier gas to carry the ozone to the point of use, and reducing the power utilization in the ozone generator by operating the generator at lower ozone concentrations than normal (e.g., 6%).

Many attempts have been made to develop a process to reduce the cost of ozone generation from oxygen by recovering the un-utilized oxygen and recycling this stream back to the ozone generation, but with limited commercial application.

What is needed is an efficient and reliable process that overcomes the fluctuations in pressure and concentration typically found in the products of PSA separation processes, without the need for large and expensive buffer tanks and which prevents the build-up of weakly adsorbed species, such as $N_2$ and Ar, in the recycled gas stream. The process of this invention provides the solution to these problems.

SUMMARY OF THE INVENTION

In a first embodiment of the invention there is disclosed a method for the continuous production of ozone and recovery of oxygen in a purge cycle adsorption process having four adsorbent beds, in which the first, second, third and fourth beds each cycle sequentially through the following steps in an overlapping cycle:

a) Feeding an oxygen and ozone mixture from an ozone generator to a first bed, wherein ozone is adsorbed in the first bed and non-adsorbed oxygen passes through the first bed and is recycled back to the ozone generator;
b) Receiving rinse gas in a counter current direction to step a) from a third bed in step d) thereby desorbing ozone from the first bed to a customer process;
c) Feeding a nitrogen-rich purge gas in the counter current direction to step a) thereby desorbing the remaining ozone from the first bed to the customer process;
d) Feeding the oxygen and ozone mixture from the ozone generator to the first bed in the same direction as in step a) whereby ozone is adsorbed in the first bed and non-adsorbed oxygen rinse gas displaces the nitrogen-rich purge gas from the first bed and feeds the displaced nitrogen-rich purge gas to a third bed now in step b), preparing the first bed to repeat step a);
e) Feeding an oxygen and ozone mixture from an ozone generator to a second bed, wherein ozone is adsorbed in the second bed and non-adsorbed oxygen passes through the second bed and is recycled back to the ozone generator;
f) Receiving rinse gas in a counter current direction to step e) from a fourth bed in step h) thereby desorbing ozone from the second bed to a customer process;
g) Feeding a nitrogen-rich purge gas in the counter current direction to step e) thereby desorbing the remaining ozone from the second bed to the customer process;
h) Feeding the oxygen and ozone mixture from the ozone generator to the second bed in the same direction as in step e) whereby ozone is adsorbed in the second bed and non-adsorbed oxygen rinse gas displaces the nitrogen-rich purge gas from the second bed and feeds the displaced nitrogen-rich purge gas to a fourth bed now in step f), preparing the second bed to repeat step e);
wherein steps e) to h) are offset in time from steps a) to d) such that the beginning of steps a) and c) overlap with the end of steps e) and g) and the end of steps a) and c) overlap with the beginning of steps e) and g).
A portion of the rinse gas may be vented to the atmosphere at the start of steps d) and h).
The make-up oxygen is mixed with recycled oxygen before it is fed to the ozone generator.
The mixture of recycled oxygen and make-up oxygen is fed through a blower to increase its pressure before being fed to the ozone generator.
The mixture of recycled oxygen and make-up oxygen is passed through an inline ozone destruct unit prior to being fed to the blower.
The oxygen and ozone gas mixture that is fed to the adsorbent beds comprises about 1 to 30% by volume ozone. More preferably, the oxygen and ozone gas mixture that is fed to the adsorbent beds comprises about 6 to 12% by volume ozone.
One source of nitrogen is clean dry air.
The buffer tanks are connected to a source selected from the group consisting of the recovered ozone, the recycled oxygen and both.
The first, second, third and fourth adsorbent beds contain an adsorbent material.
The adsorbent material is selected from the group consisting of silica gel and high silica zeolites.
The silica gel can be of different particle sizes, with larger beads located in layers at the inlet and outlet ends of the adsorption beds.
The high silica zeolites are selected from the group consisting of DAY, MFI and dealuminated mordentite.
The cycle is a concentration swing adsorption cycle.

The duration of steps a) and c) and e) and g) are equal and in the range 5 to 500 seconds, with a range of 50 to 300 seconds preferred and a range of 60 to 180 seconds more preferred.
The duration of steps b) and d) and f) and h) are equal and in the range of 5 to 90% of step a), with a range of 30 to 80% of step a) more preferred.

Further advantages of the present invention are discussed below. The adsorbent, preferably silica gel bed design uses different particle sizes for the separation of ozone from the mixture of oxygen and ozone. Alternatively, high silica zeolites such as DAY, MFI or dealuminated mordentite may be employed in place of the silica gel.

Venting of contaminants from the process will limit the build up of contaminants and harmful hydrocarbons that can cause damage to the ozone generator.

The bed purge step allows reuse of a purge gas and preserves oxygen gas compared to other processes.

The method utilizes four beds but eight and twelve bed cycles using similar steps can be employed as well.

The regeneration of the adsorbent bed using purge gas at elevated temperature not greater than 100° C. improves regeneration and can be used to deliver ozone in higher concentrations as well as potentially reduce the size of the adsorbent bed.

The adsorption of the ozone and oxygen mixture can be at temperatures down to 0° C. thereby reducing the size of the adsorbent beds.

The feed to the ozone generator and/or the first adsorbent bed could be compressed to pressures up to 50 psig (3.44 bar) to increase the adsorption capacity of the adsorbent thereby reducing the size of the adsorbent beds.

The use of an inline ozone destruction unit in the recycled oxygen line will prevent ozone breakthrough from the adsorbent beds to minimize downstream equipment damage.

The purge gas could be dry air or other nitrogen-rich gas stream with a dew point of −80° F. or lower.

The beds may be equipped with an internal source of heating or cooling to maximize the use of the adsorbent material.

Alternatively the feed to the adsorbent bed can be from the top of the bed and the purge can be performed from the bottom of the adsorbent bed.

An external ozone buffer tank can be employed, in the line taking the ozone product to the customer process to reduce swings in ozone purity.

The four bed method can be a continuous means to remove ozone from the ozone and oxygen gas mixture while minimizing the pressure or concentration swing impact in recycled oxygen gas and ozone product gas.

BRIEF DESCRIPTION OF THE DRAWINGS

FIG. 2 is a schematic of the cycle steps for the four bed oxygen recovery process.
FIG. 3 is a valve table illustrating the valve positions of FIG. 1 in different cycle sequence steps.

DETAILED DESCRIPTION OF THE INVENTION

The method of the present invention is an adsorption process for separating ozone from a mixture of oxygen and ozone in a process using four adsorption beds. It is envisioned that the process can be extended to include eight or twelve beds using similar sequence steps for the four bed as discussed below.

The method of the present invention uses silica gel as the adsorbent material to adsorb ozone. This adsorbent material is designed to have low metal contamination to prevent dissociation of ozone molecules back to oxygen molecules. In general, the adsorbent material is selected from the group consisting of silica gel and high silica zeolites, such as DAY, MFI or dealuminated mordentite. The beds as identified in FIG. 1 as A, B, C and D have three layers of different sizes of silica gel.

The first layer at the bottom of the bed contains larger particle sizes of 3 to 5 millimeter in size. This layer is designed in part to allow higher initial flow of gas into the process without danger of fluidization of the bed. This layer is between 5 to 15% of the total weight of silica gel adsorbent being used in the process.

The second layer from the bottom or middle layer has a smaller particle size and thereby high adsorption capacity and faster diffusion kinetics to allow faster cycle steps. The smaller particle sizes are typically 0.5 to 1.5 millimeter. These particles will allow better gas distribution due to higher pressure drop.

The top layer has a larger particle size. This layer will account for 5 to 15% of the total weight of adsorbent used in the process. The larger particle size allows lower susceptibility to fluidization of the top layer. These particles are typically 3 to 5 millimeters in size.

The beds are designed to operate at about 0.5 to 2.5 pounds per square inch (psi) pressure drop during operation.

Figure 1:
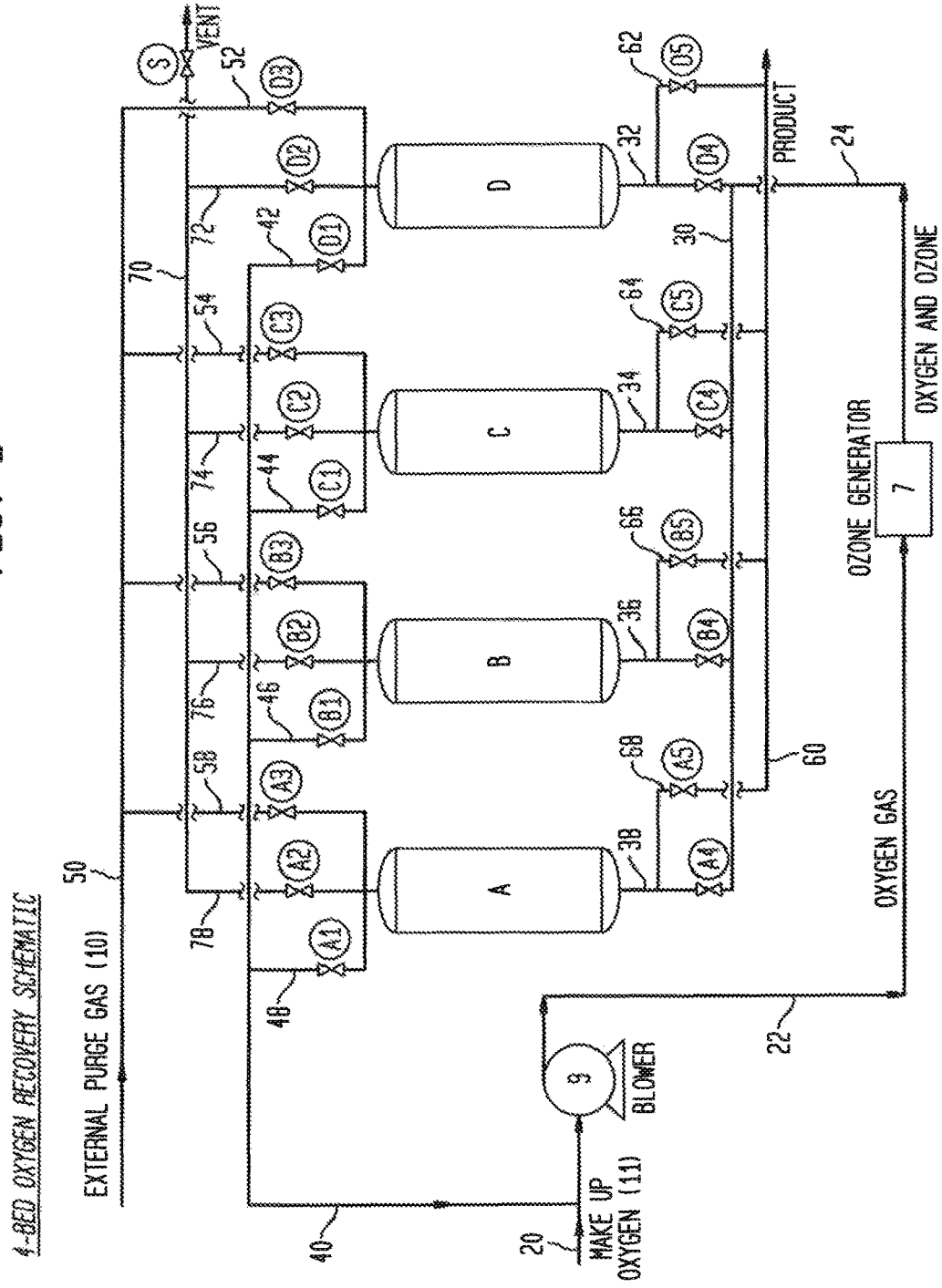
FIG. 1 is a schematic of the inventive four bed process to recover oxygen from an ozone and oxygen gas mixture.

FIG. 1 is a 4-bed oxygen recovery schematic of the invention.

Make up oxygen is supplied to the system through line 20 where it is mixed with recycled oxygen from the beds. The combined oxygen stream is fed through blower 9 to an ozone generator 7. The ozone generator will generate ozone at concentrations of 1 to 30%, preferably 5 to 15%, most preferably 8 to 10% by volume which is then fed through line 30 a manifold used to supply oxygen/ozone mixtures to the bottom of the adsorbent beds. Ozone is adsorbed within the selected adsorbent bed or beds. Line 40 collects the oxygen that passes un-adsorbed through the tops of the selected beds and recycles this stream back to the inlet to the blower 9 where it is mixed with make up oxygen. Line 50 supplies the external nitrogen rich purge gas to the tops of the beds that is used to desorb the ozone from said bed or beds. Line 60 collects the ozone product displaced from the bottom of the beds to the customer process. Manifold 70 allows oxygen rich gas to be passed from the top of a first bed to the top of a second bed, thus removing residual nitrogen from said second bed and optionally allowing any contaminants or excess inert gases to be vented externally through valve 6.

X represents an adsorbent bed and this can be any of A, B, C or D as depicted in FIG. 1. Likewise reference to a valve number preceded by X should be interpreted as being for that valve number for any of the beds A, B, C or D.

Each Bed X (X=A, B, C or D) has 2 valves controlling gas flows at the bottom (X4 and X5) and 3 valves at the top (X1, X2 and X3). For a given bed, X, only one valve at the top and one valve at the bottom is open at any one time. Valves X4 connect the bottom of bed X to the oxygen/ozone manifold, Line 30, Valves X1 connect the top of Bed X to the recycle oxygen Line 40. Valves X3 connect the top of bed X to the external nitrogen rich purge gas stream line 50. Valves X5 connect the bottoms of the bed to Line 60 the ozone product line to the customer. Valves X2 connect the top of bed X to the manifold 70 that allows gas to be transferred between the tops of two of the beds and optionally vented externally via Valve 6.

FIG. 2 depicts the sequence of steps that are undergone in the four bed oxygen recovery process of this invention.

In step 1 of the process S1, the feed gas from the ozone generator enters the bed X through valve X-4. The ozone in the feed gas is selectively adsorbed on the adsorbent in bed X. The recovered oxygen passes through the bed X and through valve X-1 and is sent to the recycle circuit. In the recycle circuit, the recovered oxygen is mixed with the makeup oxygen. The net oxygen is then compressed by a blower to overcome the pressure loss in the system and is sent to the ozone generator.

After the bed is saturated with ozone in S1, and just before the ozone starts to break through from the adsorbent bed X, step 2 (S2) of the cycle is initiated. A stream of initially nitrogen rich purge gas from another bed is fed to the top of bed X through valve X2. The purge gas comes from a bed which has just switched to oxygen/ozone feed gas and is under going step 4 (S4) and step 5 (S5) at that time. The purge gas causes the ozone adsorbed in the bed X to get desorbed and pass through valve X5 to give product ozone to the customer.

After the conclusion of S2, an external purge gas stream is introduced into the top of bed X through valve X3 in step 3 (S3). This external purge gas can be either dry air or any other dry nitrogen rich gas with a dew point less than −80° F. The purge gas further desorbs ozone on the adsorbent bed X and passes through valve X5 as product in a manner similar as in S2.

Once the ozone has sufficiently desorbed from the adsorbent bed X at the conclusion of S3, the feed gas from the ozone generator is reintroduced through valve X4. This commences step 4 (S4). In S4, unlike S1, the resulting unadsorbed gas at the top of the bed X initially has more nitrogen content from the purge step S3. This gas is utilized as a purge gas for another bed through valve X2. Also a portion of this gas is vented from the process through the vent valve to prevent the build up of unwanted contaminants like argon, hydrocarbons or water in the recycle oxygen gas.

This short vent of the contaminants is the only difference between S4 and step 5 (S5). In S5, the vent valve depicted as valve 6 in FIG. 1 is closed and the purge gas from the adsorbent bed X is continued to flow as purge to the other bed. As steps S4 and S5 proceed residual nitrogen in bed X is displaced by adsorbed ozone and unadsorbed oxygen, so that at the end of step 5, bed X is in the correct state to restart the cycle at step 1.

The duration of step 4 depends on the nature and amounts of impurities that can be tolerated in the feed to the ozone generator. Under some circumstances this step may be omitted or utilized only intermittently, e.g. once every x cycles. The duration of step 4 plus step 5, or step 5 alone if step 4 is omitted, depends on the level of nitrogen required in the feed to the ozone generator.

Figure 3:
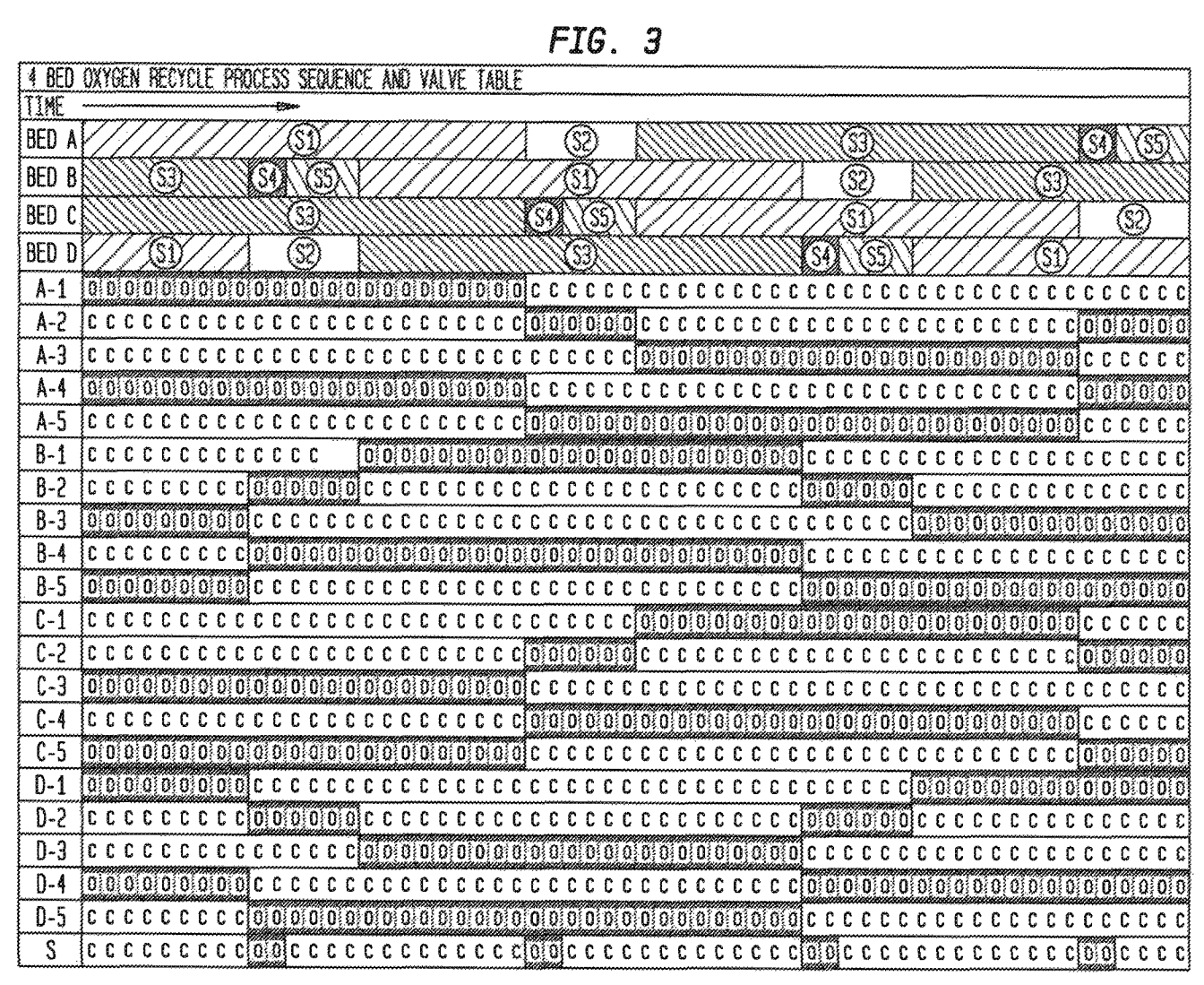

FIG. 3 is an overview of the adsorption process sequence steps S1 through S5 versus the status of the valves as being either "o" (open) or "c" (closed). The valves identified are those from FIG. 1 (X-1, X-2, X-3, X-4 and X-5 where X can be one or more of A, B, C or D and valve 6). The sequence steps identified as S1, S2, S3, S4 and S5 are those discussed above with reference to FIG. 2.

Inspection of FIG. 3 shows that the unique cycle of this invention may be viewed as the integration of two 2 bed cycles offset in time to ensure that the pressures and concentrations of the recycled oxygen and the ozone product meet both the requirements of the ozone generator and the customer process without the need for large buffer tanks. Beds A and C, and B and D form these two subsets of beds. When Bed A is in step S1 of the cycle, Bed C is in step S3, and visa-versa. When Bed A is in step S2 then Bed C undergoes Steps S4 and S5, and visa-versa. Similarly, when Bed B is in step S1 of the cycle, Bed D is in step S3, and visa-versa. When Bed B is in step S2 then Bed D undergoes Steps S4 and S5, and visa-versa. The internal purge step S2 vs S4/S5 for beds A and C occur in the middle of the oxygen recycle and ozone production steps S1/S3 for beds B and D, and visa-versa. In addition, for both steps S1 and S3, the offset cycles of the subsets of beds, A/C and B/D, ensure that, e.g. the last portion of bed A being on step S1 overlaps with the first portion of bed B being on step S1, the last portion of bed B being on step S1 overlaps with the first portion of bed C being on step S1, the last portion of bed C being on step S1 overlaps with the first portion of bed D being on step S1, the last portion of bed D being on step 1 overlaps with the first portion of bed A being on step S1, and so on, and likewise for step 3.

The step time for step S1 is equal to the step time for step 53, and falls in the range 5 to 500 seconds, preferably 50 to 300 seconds and most preferably 60 to 180 seconds.

The step time for step S2 equal to the sum of the step times of steps S4 and S5 and falls in the range 5 to 90% of the step time of step S1, preferably 30 to 80% of S1.

The 4 bed cycle of the current invention allows for the continuous production of recycle oxygen and of ozone in the external purge gas stream. Operation of the cycle in concentration swing mode, i.e. with the minimum of pressure or temperature swings between the adsorption and desorption steps, ensures that the pressures of the two product streams remain roughly constant. This mode of operation, together with the novel overlapping steps, allows the system to run without the need for large buffer tanks.

Small buffer tanks may, however, be added to one or both of the recycle oxygen and ozone product lines, in order to meet stringent needs imposed by the ozone generator manufacturer or the ozone customer.

The regeneration of the adsorbent bed using purge gas at elevated temperature not greater than 100° C. improves regeneration and can be used to deliver ozone in higher concentrations as well as potentially reduce the size of the adsorbent bed.

The adsorption of the ozone and oxygen mixture can be at temperatures down to 0° C. thereby reducing the size of the adsorbent beds.

The feed to the ozone generator could be compressed to pressures up to 50 psig (3.44 bar) to increase the adsorption capacity of the adsorbent thereby reducing the size of the adsorbent beds.

FIGS. 4 through 8 are individual breakdowns of each step S1 through S5 described above in greater detail as exemplified for adsorbent bed D.

Figure 4:
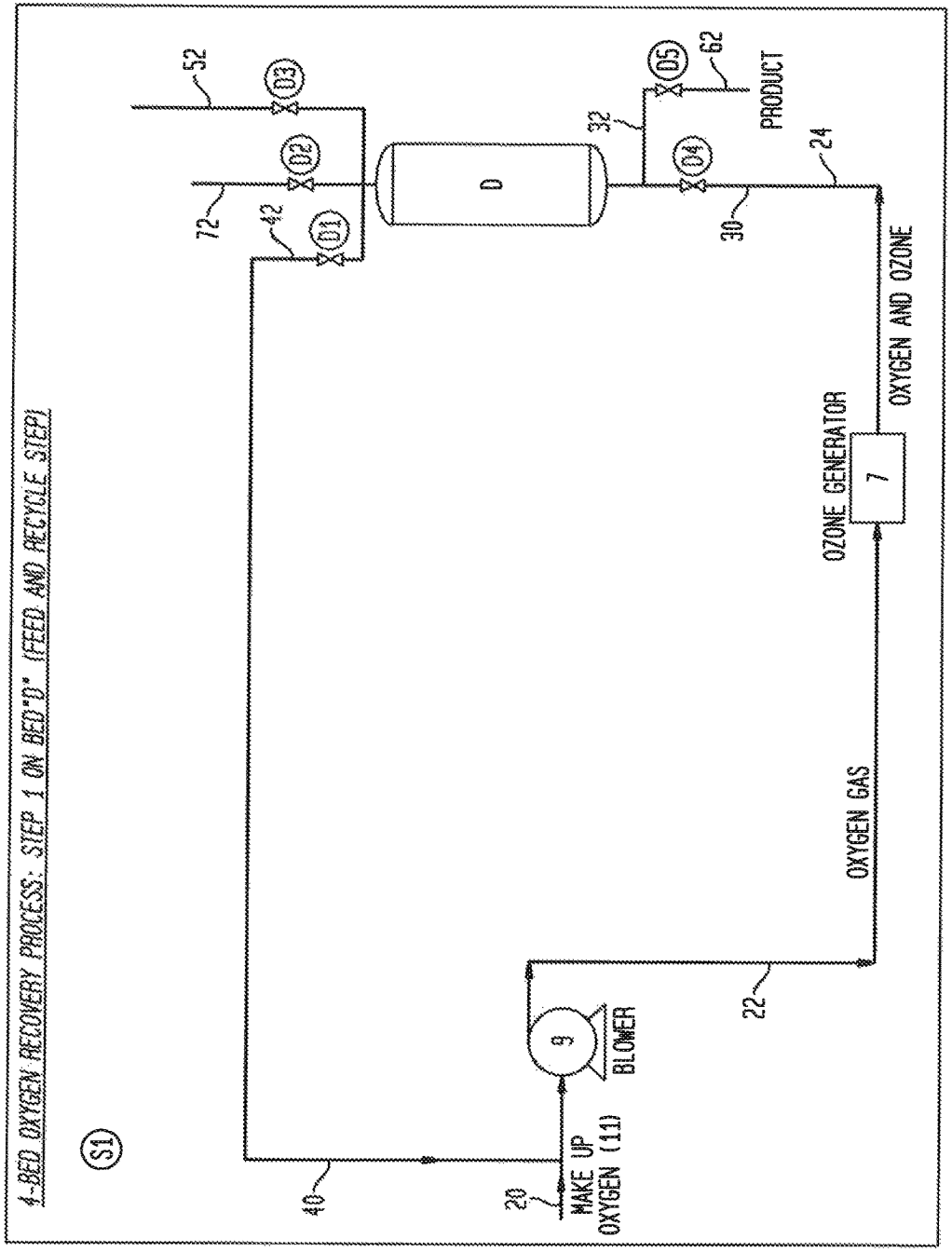
FIG. 4 is a schematic illustrating step 1 for the bed D from FIG. 1.

In FIG. 4, adsorbent bed D is on the feed and recycle step S1. Makeup oxygen is fed through line 20 to blower 9 which will deliver pressurized oxygen through line 22 to ozone generator 7. The resulting mixture of ozone and oxygen is fed through line 24 and open valve D4 via line 30 to adsorbent bed D where ozone is adsorbed and the oxygen is fed through line 40 and open valve D1 back to line 20 to join with the makeup oxygen feed.

Figure 5:
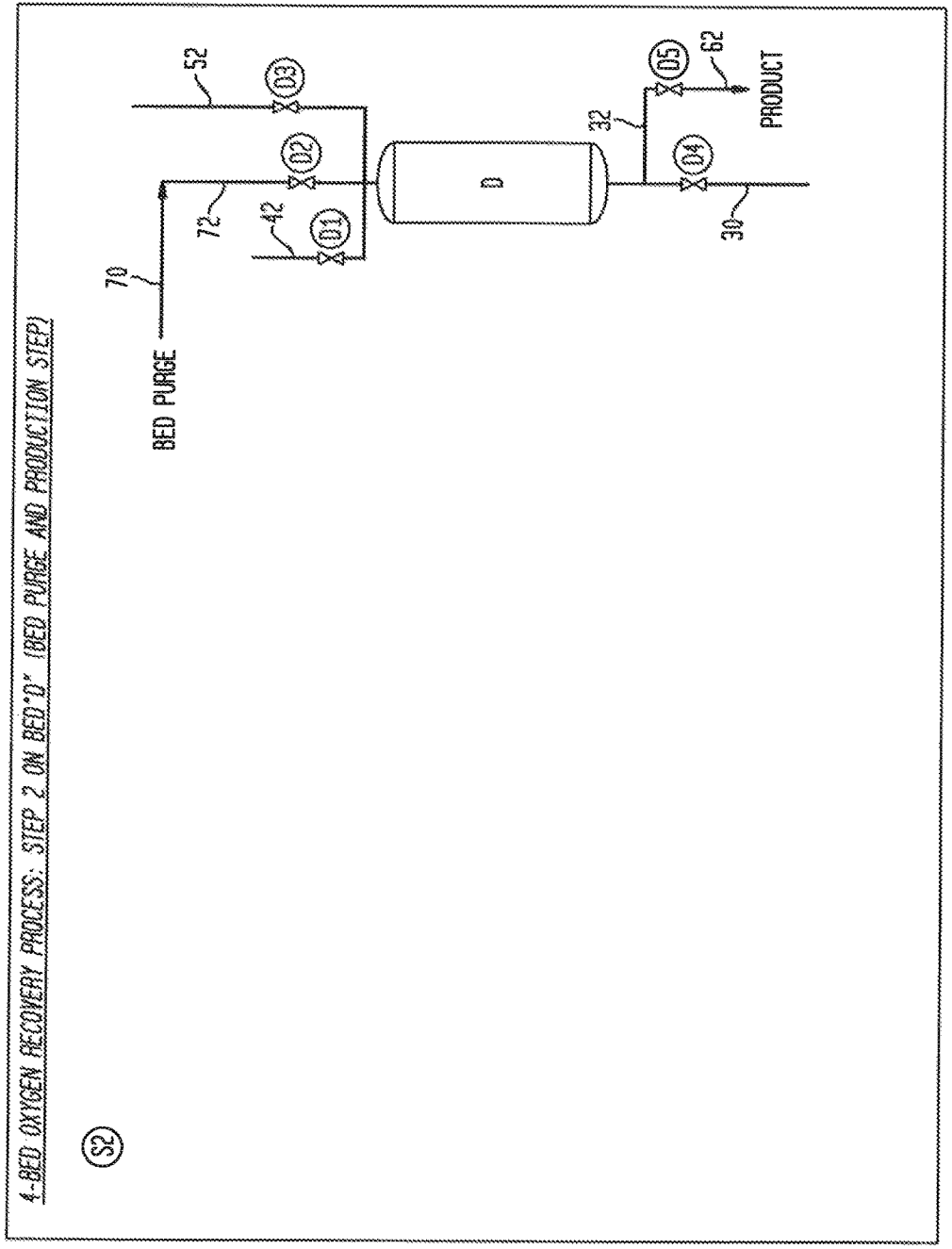
FIG. 5 is a schematic illustrating step 2 for the bed D from FIG. 1.

In FIG. 5, adsorbent bed D is on bed purge step, S2. Line 70 delivers a purge gas which is removed from the top of bed B and is fed through open valve D2 into adsorbent bed D where it will sweep out part of the ozone adsorbed from S1. The ozone exits the adsorbent bed D through line 32 and open valve D5 to line 62 where it will be collected in Line 60 and delivered to the customer process.

Figure 6:
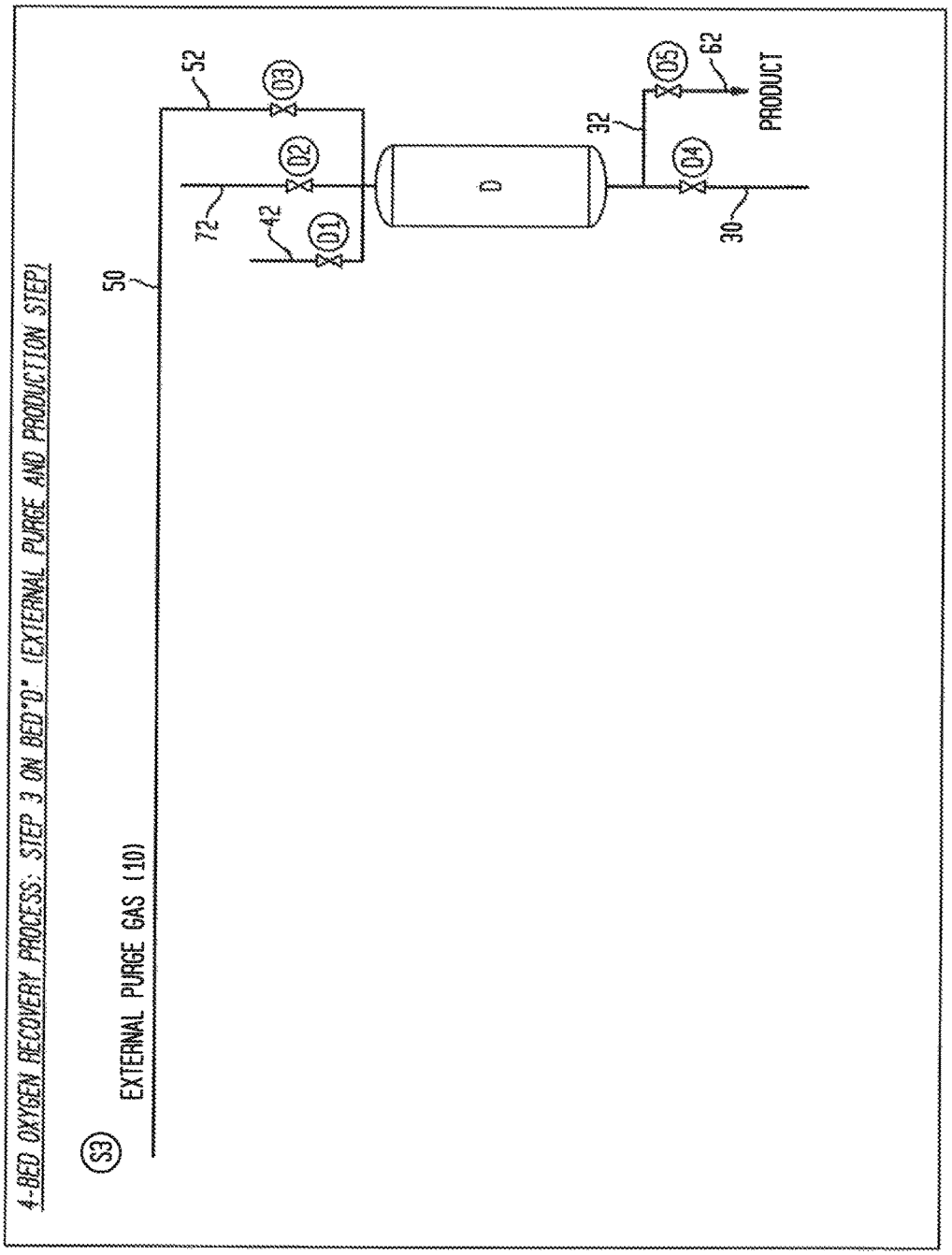
FIG. 6 is a schematic illustrating step 3 for the bed D from FIG. 1.

In FIG. 6, adsorbent bed D is on the third step S3 which is external purge step. An external purge gas which comprises air or another nitrogen rich gas is fed through line 50 and open valve D3 via line 52 into adsorbent bed D where it will sweep the adsorbed ozone out of the adsorbent and be fed through line 32 and open valve D5 to line 62 where the ozone can be collected in line 60 and delivered to the customer process.

Figure 7:
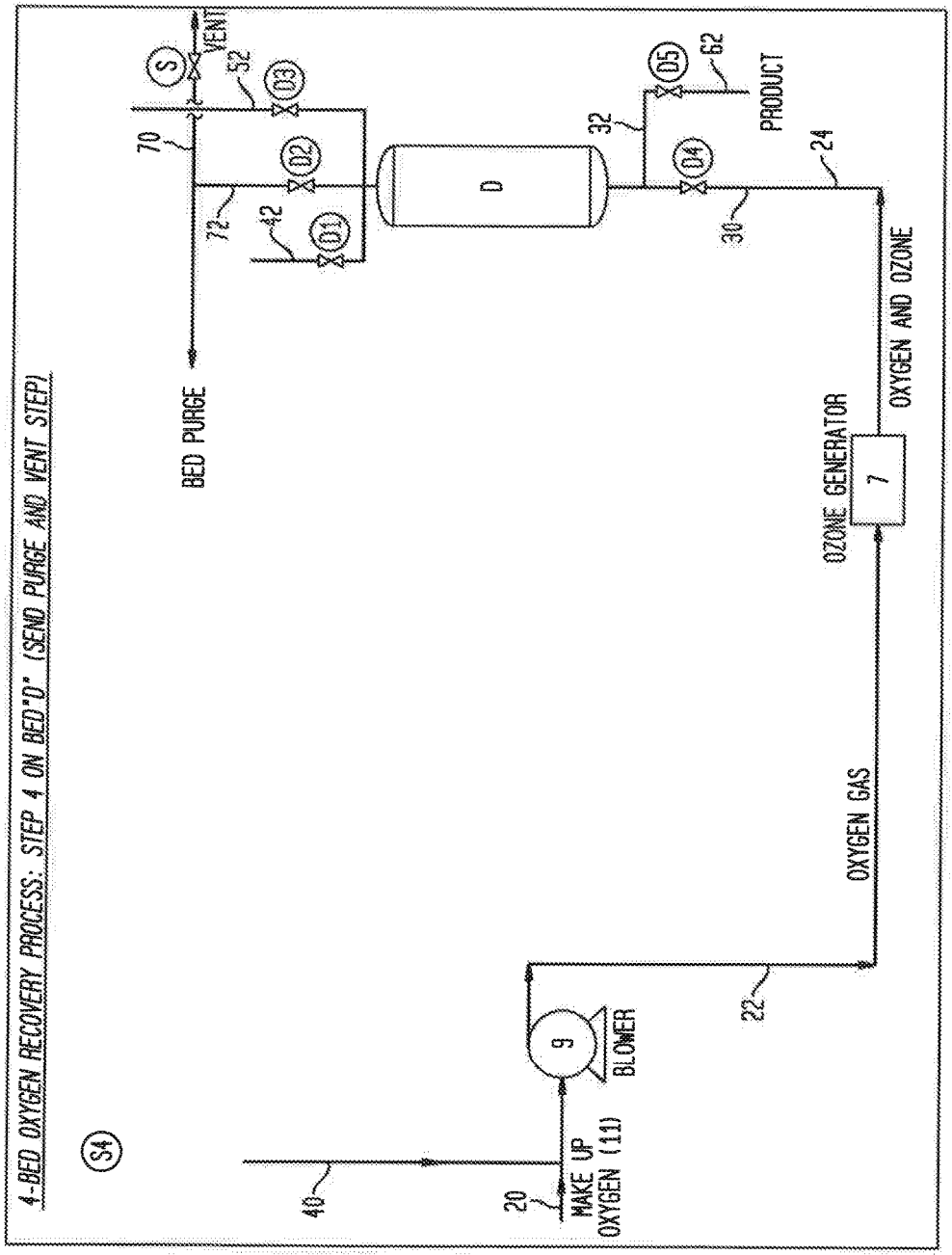
FIG. 7 is a schematic illustrating step 4 for the bed D from FIG. 1.

FIG. 7 is the send purge and vent step S4 for adsorbent bed D. Recycled oxygen from line 40 is mixed with makeup oxygen from line 20 offsetting oxygen that has been utilized in ozone generation and fed rinsing and fed to blower 9 which will deliver pressurized oxygen through line 22 to ozone generator 7. The resulting mixture of ozone and oxygen is fed through line 24 and open valve D4 to adsorbent bed D via line 30.

Oxygen will exit the adsorbent bed D through line 72 and open valve D2 after ozone is adsorbed from the mixture of oxygen and ozone. The oxygen will be fed through line 72 to line 70 where it will be directed to the top of another bed, B which is in step S2, where it will act to purge that bed as well as be fed through open valve 6 for venting to the atmosphere.

Figure 8:
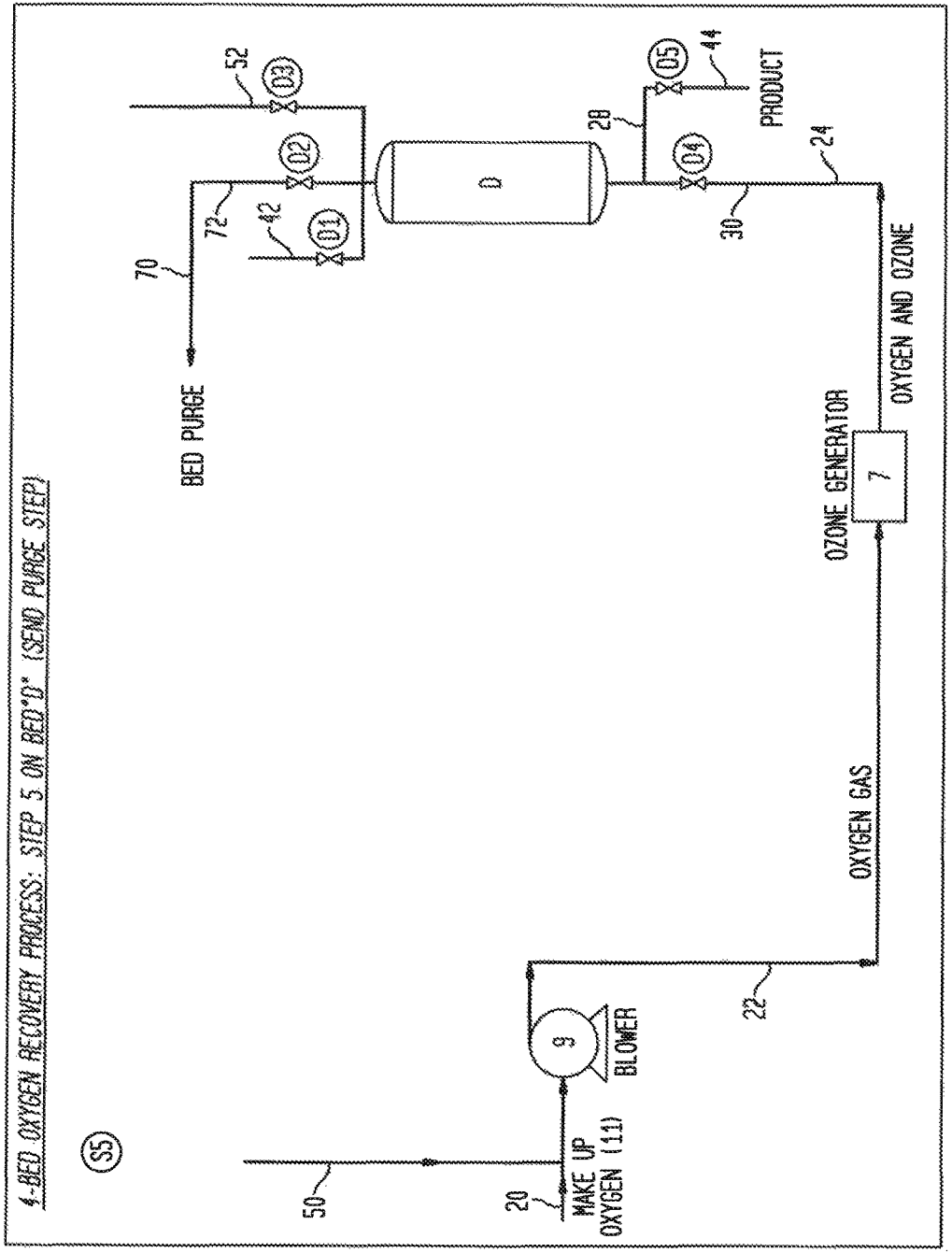
FIG. 8 is a schematic illustrating step 5 for the bed D from FIG. 1.

In FIG. 8, the adsorbent bed D is on step 5 which is the send purge step S5. Recycled oxygen from line 40 is mixed with makeup oxygen from line 20 offsetting oxygen that has been utilized in ozone generation and fed rinsing and fed to blower 9 which will deliver pressurized oxygen through line 22 to ozone generator 7. The resulting mixture of ozone and oxygen is fed through line 24 and open valve D4 via line 30 to adsorbent bed D.

The oxygen that is separated from the oxygen and ozone mixture will leave the top of the adsorbent bed D through line 72 and open valve D2 where it will be fed to the top of Bed B to push the nitrogen initially in bed D at the end of step S3 through bed B and into the ozone product and leave oxygen in the gas space in bed D ready for it restarting the cycle on step S1.

While this invention has been described with respect to particular embodiments thereof, it is apparent that numerous other forms and modifications of the invention will be obvious to those skilled in the art. The appended claims in this invention generally should be construed to cover all such obvious forms and modifications which are within the true spirit and scope of the present invention.

Having thus described the invention, what we claim is:

1. A method for the continuous production of ozone and recovery of oxygen in a purge cycle adsorption process having four adsorbent beds, in which the first, second, third and fourth beds each cycle sequentially through the following steps in an overlapping cycle:

a) Feeding an oxygen and ozone mixture from an ozone generator to a first bed, wherein ozone is adsorbed in the first bed and non-adsorbed oxygen passes through the first bed and is recycled back to the ozone generator;
b) Receiving rinse gas in a counter current direction to step a) from a third bed in step d) thereby desorbing ozone from the first bed to a customer process;
c) Feeding a nitrogen-rich purge gas in the counter current direction to step a) thereby desorbing the remaining ozone from the first bed to the customer process;
d) Feeding the oxygen and ozone mixture from the ozone generator to the first bed in the same direction as in step a) whereby ozone is adsorbed in the first bed and non-adsorbed oxygen rinse gas displaces the nitrogen-rich purge gas from the first bed and feeds the displaced nitrogen-rich purge gas to a third bed now in step b), preparing the first bed to repeat step a);
e) Feeding an oxygen and ozone mixture from an ozone generator to a second bed, wherein ozone is adsorbed in the second bed and non-adsorbed oxygen passes through the second bed and is recycled back to the ozone generator;
f) Receiving rinse gas in a counter current direction to step e) from a fourth bed in step h) thereby desorbing ozone from the second bed to a customer process;
g) Feeding a nitrogen-rich purge gas in the counter current direction to step e) thereby desorbing the remaining ozone from the second bed to the customer process;
h) Feeding the oxygen and ozone mixture from the ozone generator to the second bed in the same direction as in step e) whereby ozone is adsorbed in the second bed and non-adsorbed oxygen rinse gas displaces the nitrogen-rich purge gas from the second bed and feeds the displaced nitrogen-rich purge gas to a fourth bed now in step f), preparing the second bed to repeat step e);
wherein steps e) to h) are offset in time from steps a) to d) such that the beginning of steps a) and c) overlap with the end of steps e) and g) and the end of steps a) and c) overlap with the beginning of steps e) and g).

2. The method as claimed in claim 1 further comprising venting a portion of the rinse gas to the atmosphere at the start of step d) and step h).

3. The method as claimed in claim 1 in which make-up oxygen is mixed with recycled oxygen before it is fed to the ozone generator.

4. The method as claimed in claim 3 in which the mixture of recycled oxygen and make-up oxygen is fed through a blower to increase its pressure before being fed to the ozone generator.

5. The method as claimed in claim 3 in which the mixture of recycled oxygen and make-up oxygen is passed through an inline ozone destruct unit prior to being fed to the blower.

6. The method as claimed in claim 1 wherein the oxygen and ozone gas mixture that is fed to the adsorbent beds comprises about 1 to 30% by volume ozone.

7. The method as claimed in claim 6 wherein the oxygen and ozone gas mixture that is fed to the adsorbent beds comprises about 6 to 12% by volume ozone.

8. The method as claimed in claim 1 wherein a source of nitrogen is clean dry air.

9. The method as claimed in claim 1 wherein buffer tanks are connected to a source selected from the group consisting of the recovered ozone, the recycled oxygen and both.

10. The method as claimed in claim 1 wherein the first, second, third and fourth adsorbent beds contain an adsorbent material.

11. The method as claimed in claim 10 wherein the adsorbent material is selected from the group consisting of silica gel and high silica zeolites.

12. The method as claimed in claim 11 wherein the silica gel is of different particle sizes.

13. The method as claimed in claim 11 wherein the high silica zeolites are selected from the group consisting of DAY, MFI and dealuminated mordentite.

14. The method as claimed in claim 1 wherein the cycle is a concentration swing adsorption cycle.

15. The method as claimed in claim 1 wherein the duration of steps a) and c) and steps e) and g) are equal and in the range 5 to 500 seconds.

16. The method as claimed in claim 1 wherein the duration of steps a) and c) and steps e) and g) are equal and in the range of 50 to 300 seconds.

17. The method as claimed in claim 1 wherein the duration of steps a) and c) and steps e) and g) are equal and in the range of 60 to 180 seconds.

18. The method as claimed in claim 1 wherein the duration of steps b) and d) and steps f) and h) are equal and in the range of 5 to 90% of step a).

19. The method as claimed in claim 1 wherein the duration of steps b) and d) and steps f) and h) are equal and in the range of 30 to 80% of step a).

* * * * *